United States Patent Office 2,995,582
Patented Aug. 8, 1961

2,995,582
DERIVATIVES OF 5-HYDROXYMETHYL FURFURAL AND PROCESS OF PRODUCING THEM
John D. Garber, Westfield, Robert A. Gasser, North Plainfield, and Robert E. Jones, Rahway, N.J., assignors to Merck & Co., Inc., Rahway, N.J., a corporation of New Jersey
No Drawing. Filed Dec. 30, 1958, Ser. No. 783,699
1 Claim. (Cl. 260—347.7)

This invention relates to derivatives of 5-hydroxymethyl furfural, and has for its object the provision of a series of tetrahydrofuran compounds and a process of producing the compounds. The compounds of the invention may be represented by the formula:

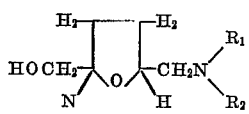

in which $R_1$ and $R_2$ may be the same or different radicals selected from hydrogen, lower alkyl up to 8 carbon atoms and aryl. These radicals may be further substituted such as with halogen, oxygenated and lower alkyl groups.

In accordance with the invention, 5-hydroxymethyl furfural is subjected to reductive amination with a suitable catalyst to form compounds of the invention. When 5-hydroxymethyl furfural is subjected to reductive amination with ammonia $R_1$ and $R_2$ are both hydrogen in the above formula. When 5-hydroxymethyl furfural is subjected to reductive amination with a primary or a secondary amine the resulting compound includes at least one of the above radicals other than hydrogen. For example the invention contemplates the use of an amine represented by

in which $R_1$ and $R_2$ are as above defined, or one of them may be hydroxyethyl for example.

5-hydroxymethyl furfural is a known compound that is presently available, and is used in the process of the invention with any suitable catalyst, such as a Raney nickel catalyst, and a suitable nitrogenous compound to form the tetrahydrofuran amine. The following examples are illustrative of processes carried out according to the invention for the production of the new compounds.

*Example I.—Reductive amination of 5-hydroxymethyl furfural with ammonia*

Fifty grams (0.395 mol) of 5-hydroxymethyl furfural (distilled) was dissolved in 135 cc. of reagent methanol, 20 cc. of liquid ammonia (15.2 g.=0.9 mol) was added with 1¼ teaspoon of Raney nickel and the mixture placed under 5500–6000 p.s.i. hydrogen pressure. After heating at 150° C. (with shaking) for 10 hours, the mixture was cooled, filtered from the catalyst, and the volatile materials were removed on a steam bath. The dark residue was distilled at 0.08 mm. and the product cut boiled at 76.6–81.8° C at this pressure. The viscous, water-white liquid, 5-aminomethyl tetrahydrofurfuryl alcohol, weighed 41.18 g. (79.5%). $N_D^{25.2}=1.4870$. In this run, three distillation cuts were taken, 3.90 g., $N_D^{25.2}=1.4860$; 23.69 g., $N_D^{25.2}=1.4872$, and 13.59 g., $N_D^{25.2}=1.4868$, which were combined as described above. Density, 1.1008. Anal. Calc'd for $C_6H_{13}NO_2$: C, 54.94%, H, 9.99%, N, 10.68%. Found: C, 55.20%, H, 9.85%, N, 10.85%.

*Example II.—Reductive amination of 5-hydroxymethyl furfural with ethylamine*

A mixture of 25.2 g. (0.2 mol) of 5-hydroxymethyl furfural (distilled) and 63.5 g. of 70% ethylamine solution was added to 66.7 cc. of methanol (cooled during mixing). The mixture turned dark. One teaspoon of Raney nickel was added and the solution heated at 150° C. for 20 hours under hydrogen at 6000 p.s.i.

After cooling, the solution (light yellow) was filtered from the catalyst and distilled after removal of the methanol. A yield of 24.5 g. (77.1%) distilling at 72–75° C./0.220 mm., $N_D^{25}=1.4709$, of N-ethyl-5-aminomethyl tetrahydrofurfuryl alcohol was obtained. Anal. Calc'd for $C_8H_{17}NO_2$: C, 60.34%, H, 10.76%, N, 8.80%. Found: C, 60.59%, H, 10.79%, N, 8.53%.

*Example III.—Reductive amination of 5-hydroxymethyl furfural with diethylamine*

A mixture of 25.2 g. 5-hydroxymethyl furfural (0.2 mol) in 35 cc. of methanol was treated with 73.1 g. (107 cc. of 1 mol) of freshly distilled diethylamine. The mixture warmed and darkened considerably. One teaspoon of Raney nickel was added and the mixture was treated at 150° C. at 5000–6000 p.s.i. of hydrogen for 12 hours.

After the catalyst was filtered from the cooled mixture, through a Supercel and Darco product, the solvent and diethylamine were removed by vacuum distillation on the aspirator. The product was distilled at 0.20 mm., B.P. 77–78.5° C. The yield of N-diethyl-5-aminomethyl tetrahydrofurfuryl alcohol was 14.71 g. (39.4%), $N_D^{28}=1.4650$, a very hygroscopic, water-white liquid with little odor, strong alkaline reaction. Anal. Calc'd for $C_{10}H_{21}NO_2$: C, 64.13%, H, 11.30%, N, 7.48%. Found: C, 63.20%, H, 11.72%, N, 7.00%.

*Example IV.—Reductive amination of 5-hydroxymethyl furfural with ethanolamine*

A mixture of 25.2 g. of 5-hydroxymethyl furfural (0.2 mol) with 61.08 g. (1 mol) of redistilled ethanolamine and 66.7 cc. of methanol was treated with 1 teaspoon of Raney nickel and heated at 150° C. under 5000–6000 p.s.i. of hydrogen for 20 hours. The catalyst was removed by filtration and the ethanolamine removed by distillation. A product cut of 29.05 g., B.P. 71–145° C. at 145 microns was taken which was redistilled at 200 microns. A cut of 13.43 g. appeared to be the pure N-hydroxy ethyl-5-aminomethyl tetrahydrofurfuryl alcohol, and boiled at 135–143° C. at 200–300 microns, $N_D^{24}=1.4930$. The residue had a light color, wt. 8.82 g., $N_D^{24.3}=1.4922$ and was probably the same product. Yield, 63.5%. Anal. for $C_7H_{17}NO_3$: Calc'd C, 51.51%, H, 10.50%, N, 8.58%. Found: C, 51.15%, H, 8.71%, N, 7.78%.

*Example V.—Reductive amination of octyloxymethyl furfural*

The n-octyl ether of 5-hydroxymethyl furfural was reductively aminated with Raney nickel in the presence of excess ammonia and a hydrogen pressure of 6000 p.s.i. The reaction was carried out at 150° C. for 20 hours in a rocking autoclave. The liquid product showed the correct analysis for octyloxymethyl tetrahydrofurfuryl amine, $N_D^{25}=1.4539$. The hydrochloride salt was prepared, M.P. 76–77.5° C.

*Example VI.—Ditosylate of 5-aminomethyl tetrahydrofurfuryl alcohol*

In 2.5 cc. of dry pyridine, 250 mg. of the amino alcohol was dissolved, cooled to 0° C. and 750 mg. of p-toluene sulfonyl chloride was added in 1 cc. of dry pyridine. The amber yellow solution was allowed to stand in the refrigerator overnight and was added to 6–7 cc. of water. An oil formed which crystallized on standing. After recrystallization from ethanol, the derivative melted at 136.2–137.8° C. Anal. Calc'd $C_{20}H_{25}NS_2O_6$: C, 54.65%, H, 5.73%, N, 3.19%, S, 14.59%. Found: C, 54.79%, H, 5.54%, N, 3.37%, S, 14.57%.

*Example VII.—N-methyl-5-aminomethyl tetrahydrofurfuryl alcohol*

The process of Example II is carried out but methylamine is used instead of ethylamine. This produces N-methyl-5-aminomethyl tetrahydrofurfuryl alcohol.

*Example VIII.—N-dimethyl-5-aminomethyl tetrahydrofurfuryl alcohol*

The process of Example III is carried out but dimethylamine is used instead of diethylamine. This produces N-dimethyl-5-aminomethyl tetrahydrofurfuryl alcohol.

*Example IX.—N-propyl-5-aminomethyl tetrahydrofurfuryl alcohol*

The process of Example II is carried out but propylamine is used instead of ethylamine. This produces N-propyl-5-aminomethyl tetrahydrofurfuryl alcohol.

*Example X.—N-dipropyl-5-aminomethyl tetrahydrofurfuryl alcohol*

The process of Example III is carried out but diproylamine is used instead of diethylamine. This produces N-dipropyl-5-aminomethyl tetrahydrofurfuryl alcohol.

*Example XI.—N-butyl-5-aminomethyl tetrahydrofurfuryl alcohol*

The process of Example II is carried out but butylamine is used instead of ethylamine. This produces N-butyl-5-aminomethyl tetrahydrofurfuryl alcohol.

*Example XII.—N-dibutyl-5-aminomethyl tetrahydrofurfuryl alcohol*

The process of Example IV is carried out but dibutylamine is used instead of ethanolamine. This produces N-dibutyl-5-aminomethyl tetrahydrofurfuryl alcohol.

*Example XIII.—N-hexyl-5-aminomethyl tetrahydrofurfuryl alcohol*

The process of Example II is carried out but hexylamine is used instead of ethylamine. This produces N-hexyl-5-aminomethyl tetrahydrofurfuryl alcohol.

*Example XIV.—N-dihexyl-5-aminomethyl tetrahydrofurfuryl alcohol*

The process of Example III is carried out but dihexylamine is used instead of diethylamine. This produces N-dihexyl-5-aminomethyl tetrahydrofurfuryl alcohol.

*Example XV.—N-octyl-5-aminomethyl tetrahydrofurfuryl alcohol*

The process of Example II is carried out but octylamine is used instead of ethylamine. This produces N-octyl-5-aminomethyl tetrahydrofurfuryl alcohol.

*Example XVI.—N-dioctyl-5-aminomethyl tetrahydrofurfuryl alcohol*

The process of Example III is carried out but dioctylamine is used instead of diethylamine. This produces N-dioctyl-5-aminomethyl tetrahydrofurfuryl alcohol.

*Example XVII.—N-phenyl-5-aminomethyl tetrahydrofurfuryl alcohol*

The process of Example II is carried out but aniline is used instead of ethylamine. This produces the compound N-phenyl-5-aminomethyl tetrahydrofurfuryl alcohol.

*Example XVIII.—N-methyl-N-ethyl-5-aminomethyl tetrahydrofurfuryl alcohol*

The process of Example III is carried out but methyl ethylamine is used instead of diethylamine. This produces the compound N-methyl-N-ethyl-5-aminomethyl tetrahydrofurfuryl alcohol. This example will serve to illustrate other compounds in which $R_1$ and $R_2$ are dissimilar lower alkyl radicals, and those compounds in which $R_1$ is an aryl radical as phenyl and $R_2$ is a lower alkyl radical.

The compounds of the invention are generally useful as solvents for use in fractionation and extraction procedures, as acid-gas scrubbers for use in the removal for example of hydrogen sulfide and carbon dioxide and as corrosion inhibitors. The free amine is particularly useful as an acid-gas scrubber and as a solvent for paint removers and as a solvent to separate paraffins from aromatics. The compounds in which $R_1$ is lower alkyl such as ethyl or hydroxyethyl or phenyl are particularly useful as acid-gas scrubbers as above, and when both $R_1$ and $R_2$ are alkyl or phenyl the compounds are useful as corrosion inhibitors such as for automobile cooling systems and turbine oil lubricants, and also as acid-gas scrubbers. These latter disubstituted compounds are also useful as hydraulic fluids as in brake systems.

When used as acid-gas scrubbers the compound is used as a 5 to 40% aqueous solution and the gas is brought into intimate contact with the solvent solution. When the compounds are used as solvents they may be used full strength or may be diluted with from 5 to 10% water. As corrosion inhibitors they will be effective in as small amounts as from 0.1 to 3.0% concentration.

This application is a continuation-in-part of our application Serial No. 620,167, filed on November 5, 1956, now abandoned, and having the same title.

What is claimed is:

The compound:

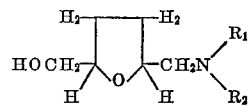

in which $R_1$ and $R_2$ are lower alkyl radicals having up to 8 carbon atoms.

References Cited in the file of this patent

UNITED STATES PATENTS

| | | |
|---|---|---|
| 2,109,159 | Winans | Feb. 22, 1938 |
| 2,191,029 | McNally et al. | Feb. 20, 1940 |
| 2,739,159 | Tyndall | Mar. 20, 1956 |